C. D. BABCOCK.
CURRENT INDICATOR OR DETECTOR.
APPLICATION FILED AUG. 15, 1908.
927,314.
Patented July 6, 1909.
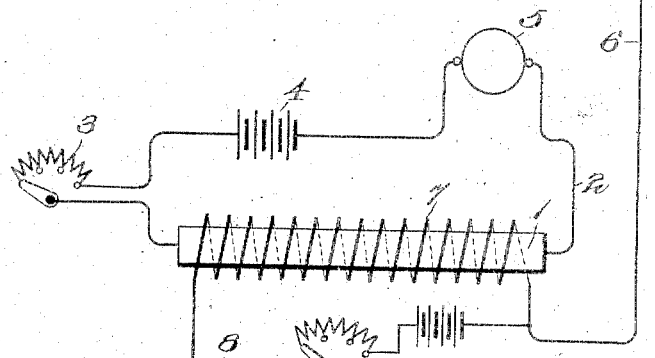
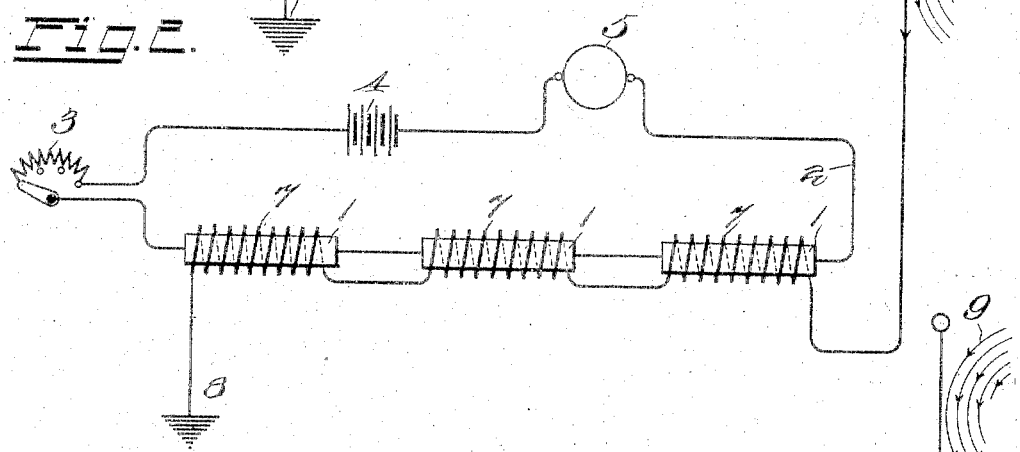
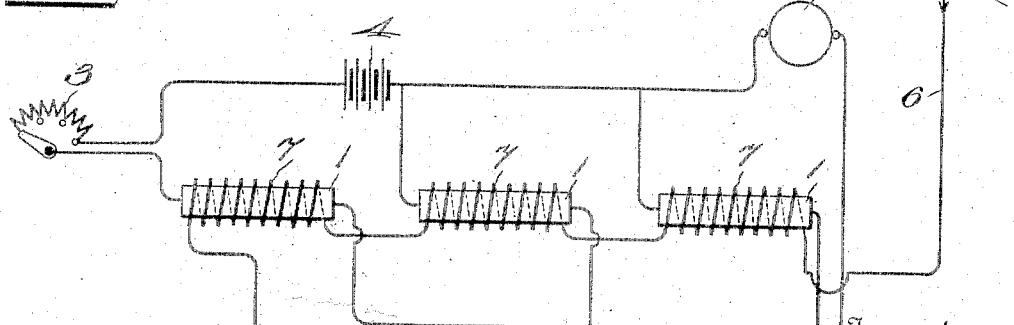

UNITED STATES PATENT OFFICE.

CLIFFORD D. BABCOCK, OF NEW YORK, N. Y.

CURRENT INDICATOR OR DETECTOR.

No. 927,314.

Specification of Letters Patent.

Patented July 6, 1909.

Application filed August 15, 1908. Serial No. 448,699.

*To all whom it may concern:*

Be it known that I, CLIFFORD D. BABCOCK, a citizen of the United States, residing at New York, in the county of New York and State of New York, have invented certain new and useful Improvements in Current Indicators or Detectors; and I do hereby declare the following to be a full, clear, and exact description of the invention, such as will enable others skilled in the art to which it appertains to make and use the same.

The present invention relates to a current indicator or detector, and has for its object the production of a device which will be exceedingly sensitive to small changes in the energy received, and one that will be easy to operate, and not liable to get out of order.

To these ends the invention consists in the novel details and combinations of parts more fully hereinafter disclosed and particularly pointed out in the claims.

Referring to the accompanying drawings forming a part of this specification in which like numerals also refer to like parts in all the views:—Figure 1, is a diagrammatic view showing one form of the invention, in which only a single sensitive conducting element is employed. Fig. 2, is a like view showing a modification, in which a plurality of such elements in series are employed, and Fig. 3, is a view similar to Fig. 2 but showing a plurality of the sensitive elements joined in parallel.

It is well known that certain salts and mixtures of salts which are only slightly conductive at certain temperatures, increase their conductivities as the temperature rises to a certain critical point, which generally differs for each salt; and it is also well known that after the temperature passes the said critical point, these salts have the remarkable property of increasing their conductivities at a rate far higher than the rate at which said conductivities were increased before said point was reached. Among such salts may be mentioned certain oxids of the metals, for example, cupric oxid CuO, magnesium oxid, and plumbic oxid. Also, certain halogen compounds, as for example the mercury sublimates, and certain oxids; as well as certain sulfids and even ordinary glass. I take advantage of these properties by providing a sensitive conducting element 1 consisting of a suitable quantity of such a salt or a mixture of such salts, and join it in a circuit 2, provided with a suitable rheostat 3, a source of current 4, and any suitable telephone receiver, current detector, indicator or recorder 5.

6 represents an aerial adapted to receive Hertzian waves; 7 a coil surrounding said element 1, joined to said aerial and grounded as at 8.

In Fig. 2, a plurality of sensitive elements are employed joined in series; and in Fig. 3 some of said elements are joined in parallel.

In operation sufficient current may be first passed through the coil 7 surrounding the sensitive element 1 to raise it to or above the critical temperature; or it may be raised to such critical temperature and kept there by any other suitable means, and the current then passing through may be suitably regulated to aid in keeping the said sensitive element at or above its critical point. In either case any increase of temperature beyond the critical point will very greatly reduce the electrical resistance of said element or elements 1, and therefore the indicating or other instrument 5 will show such fact. Therefore, if electro-magnetic waves, diagrammatically indicated at 9, impinge upon the aerial 6, a current will traverse the coil 7 and increase the temperature of the sensitive conducting element, or elements 1, which will at once permit a larger current to flow through the circuit 2, and the instrument 5 will disclose that fact. In this way very minute changes in the received energy may be detected and read as telegraphic or other signals, or as articulate speech.

It is apparent that this device is capable of general application when used for the detection of very small changes in the energy received, and therefore I do not wish to be limited to any single specific use.

What I claim is:—

1. In the art of detecting weak currents, a sensitive conducting element comprising in its composition a chemical salt having the property of changing its conductivity as its temperature changes until a critical temperature is reached, and then increasing said conductivity at a different rate for further changes of temperature, substantially as described.

2. A member of a detector for weak currents which comprises in its composition a metallic oxid, whose conductivity is sensitive to changes in temperature, and which is conductively joined to both terminals of the detector circuit, substantially as described.

3. A detector for weak currents provided with an indicator, and a sensitive conducting element comprising a metallic oxid conductively joined to both terminals of the indicator circuit, whose conductivity changes as the temperature changes, and a heater for said element, substantially as described.

4. In a Hertzian wave detector the combination of a sensitive salt whose conductivity changes with changes in the temperature; a complete metallic circuit passing through the same; means to detect weak currents in said circuit; and means for heating said element, substantially as described.

5. Means for detecting Hertzian waves, comprising a sensitive conducting element composed of a metallic oxid; a circuit including a detector for weak currents passing through said element; an aerial; and a coil surrounding said element joined to said aerial, substantially as described.

6. Means for detecting Hertzian waves, comprising a plurality of sensitive conducting elements composed of metallic oxids; a circuit in which said elements are included; means for heating said elements; a detecting instrument; and an aerial joined to said heating means, substantially as described.

7. In a Hertzian wave receiver, the combination of a plurality of sensitive conducting elements composed of cupric oxid; a circuit passing through said elements; a current detector in said circuit; a plurality of coils surrounding said elements; and an aerial to which said coils are connected, substantially as described.

In testimony whereof, I affix my signature, in presence of two witnesses.

CLIFFORD D. BABCOCK.

Witnesses:
   CHARLES FULLER,
   WILLIAM J. CANARY.